United States Patent [19]

Dreyer et al.

[11] Patent Number: 5,709,558
[45] Date of Patent: Jan. 20, 1998

[54] ELECTRONICS ENCLOSURE

[75] Inventors: Volker Dreyer, Lörrach; Thomas Werner, Maulburg, both of Germany

[73] Assignee: Endress + Hauser GmbH + Co., Maulburg, Germany

[21] Appl. No.: 721,114

[22] Filed: Sep. 26, 1996

[30] Foreign Application Priority Data

Sep. 28, 1995 [EP] European Pat. Off. ............ 95115323

[51] Int. Cl.⁶ .................................................. H01R 13/652
[52] U.S. Cl. ........................... 439/95; 439/936; 340/620
[58] Field of Search ........................... 439/95, 608, 936, 439/92

[56] References Cited

U.S. PATENT DOCUMENTS

| | | | |
|---|---|---|---|
| 3,560,630 | 2/1971 | Heather | 439/95 |
| 3,790,858 | 2/1974 | Brancaleone et al. | 439/95 |
| 4,594,584 | 6/1986 | Pfeiffer et al. | 340/620 |

FOREIGN PATENT DOCUMENTS

| | | |
|---|---|---|
| 33 37 991 | 4/1984 | Germany. |
| 42 33 185 | 1/1991 | Germany. |
| 43 11 963 | 10/1994 | Germany. |
| 2 132 003 | 6/1984 | United Kingdom. |

*Primary Examiner*—Gary F. Paumen
*Attorney, Agent, or Firm*—Bose McKinney & Evans

[57] ABSTRACT

The electronics enclosure comprises, surrounded by a metal shroud, an open end closed off by a plug of insulating material fitted in the metal shroud, in which contact members are provided for connecting the electronics assembly accommodated in the electronics enclosure to outer connecting leads. One of the contact members is a grounding contact member including a ring on which radially protruding spring claws of elastic material are provided. The plug is provided with a peripheral groove, and the ring of the grounding contact member is applied level with the peripheral groove in the plug such that the spring claws protrude into the peripheral groove. The length of the spring claws is dimensioned so that on insertion of the plug in the metal shroud they are flexed in the metal shroud and come into spring contact with the inside surface of the metal shroud. As a result of this the plug is fixed in the metal shroud and, at the same time, a good electrical contact is produced between the grounding contact member and the metal shroud.

8 Claims, 2 Drawing Sheets

U.S. Patent   Jan. 20, 1998   Sheet 1 of 2   5,709,558
FIG. 1
FIG. 2
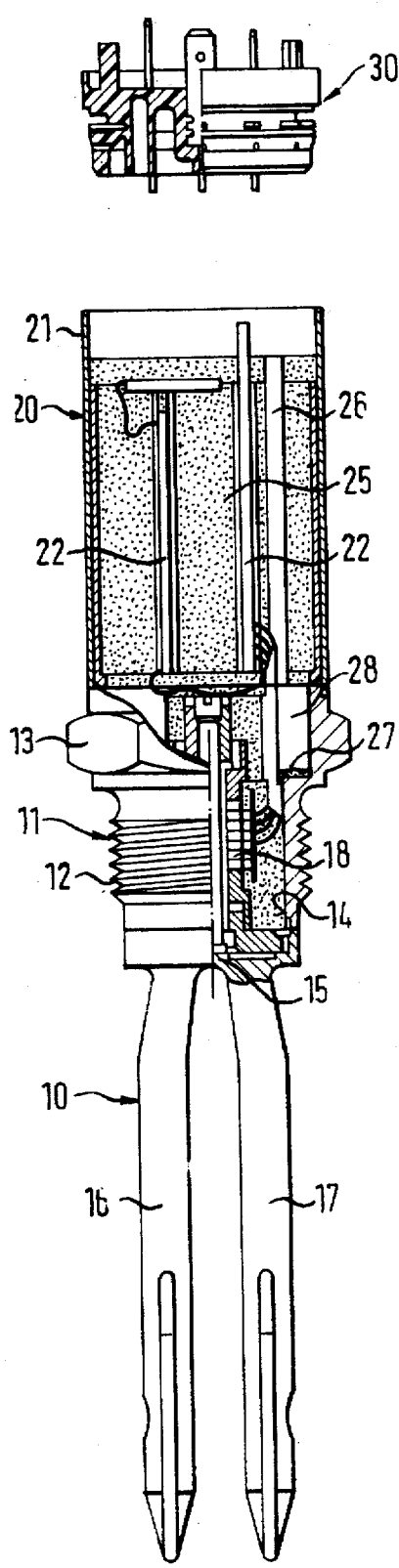
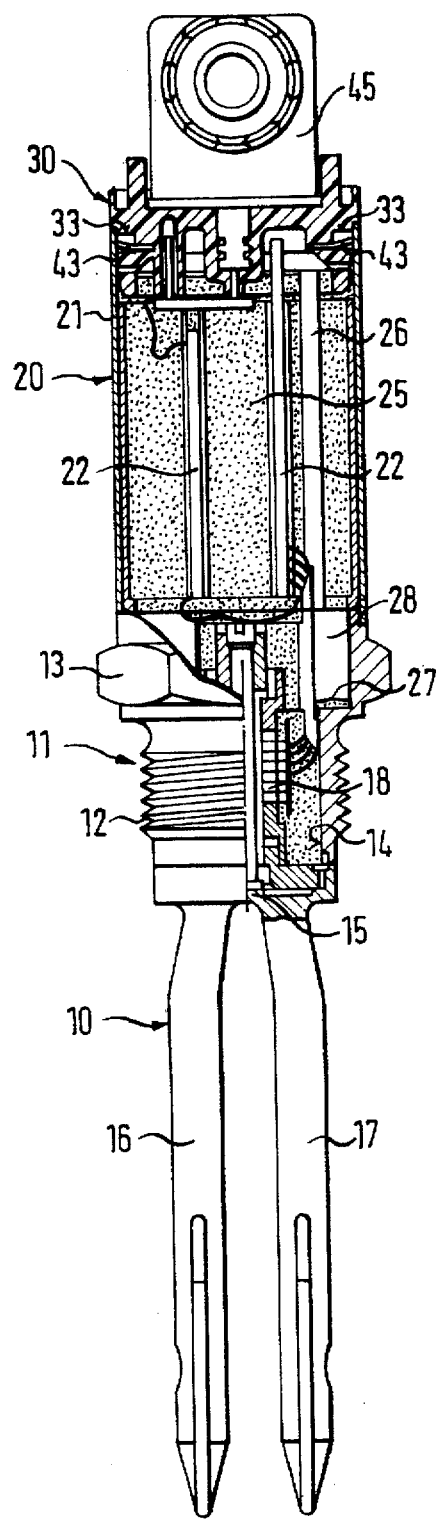

ELECTRONICS ENCLOSURE

BACKGROUND OF THE INVENTION

The invention relates to an electronics enclosure comprising, surrounded by a metal shroud, an open end closed off by a plug of insulating material fitted in the metal shroud, in which contact members having connecting parts extending from the plug outwardly and inwardly are provided for connecting the electronics assembly accommodated in the electronics enclosure to outer connecting leads, one of the contact members being a grounding contact member.

SUMMARY OF THE INVENTION

The object of the invention is to provide an electronics enclosure of this kind permitting simple, speedy and reliable securement of the plug in the open end of the electronics enclosure and, at the same time, ensuring a satisfactory electrical connection of the metal shroud to the grounding contact member of the plug.

According to the invention this object is achieved in that the plug includes a peripheral groove, that the grounding contact member includes a ring connected to the connecting parts on which radially protruding spring claws of elastic metal are provided, that the ring is applied level with the peripheral groove in the plug such that the spring claws protrude into the peripheral groove, and that the length of the spring claws is dimensioned so that their ends protrude past a cross-section, corresponding to the opening cross-section of the metal shroud, to such an extent that the spring claws on insertion of the plug in the metal shroud are flexed and come into spring contact with the inside surface of the metal shroud.

To close off the electronics enclosure according to the invention the plug is simply inserted into the open end of the electronics enclosure. On insertion of the plug the ends of the spring claws come up against the edge of the metal shroud so that they are held back on further insertion of the plug and are thereby flexed. Flexing is made possible by the spring claws having sufficient room to change shape in the peripheral groove. When, in conclusion, the spring claws are sufficiently flexed, their ends are able to slide along the inside surface of the metal shroud with which they are in spring contact. Due to this spring contact, inserting the plug is not perceptibly made difficult, whereas in the opposite direction, the flexed spring claws exert a high resistance to the movement of the plug since their ends then dig into the metal shroud. Accordingly, the plug is secured in the electronics enclosure practically non-releasably without any tools or additional fastening means being needed for this purpose. Since the flexed spring claws come into contact with the inside surface of the metal shroud with considerable ground-pressure force, a good electrical contact between the grounding contact member and the metal shroud is achieved at the same time. Both the holding effect and the contact making are all the better, the greater the number of spring claws.

Since the plug is held and centered by the spring claws in the opening of the electronics enclosure, the plug itself no longer needs to exercise these functions. One advantageous aspect of the electronics enclosure according to the invention thus consists in that the rim portions of the plug located on both sides of the peripheral groove, which are located within the metal shroud when the plug is fully inserted, have a cross-section which is slightly smaller than the opening cross-section of the metal shroud, so that between these rim portions and the metal shroud a narrow gap exists. As a result of the gap created in this way the air displaced on insertion of the plug is able to escape from the electronics enclosure so that no overpressure exists in the electronics enclosure.

When the electronics enclosure is filled directly prior to insertion of the plug with a fluid potting compound which hardens following insertion of the plug, the gap between the rim portions of the plug and the metal shroud is preferably dimensioned so that potting compound is drawn into the peripheral groove by the capillary effect. This achieves two effects: on the one hand this prevents potting compound from emerging outwards, and on the other the potting compound having collected in the peripheral groove provides, on hardening, a good additional seal between the plug and the metal shroud.

BRIEF DESCRIPTION OF THE DRAWING

Further features and advantages of the invention will be appreciated from the following description of an electronics enclosure illustrated in the drawings in which:

FIG. 1 is a partly sectioned view of an electromechanical level sensor having an electronics enclosure in accordance with the invention prior to insertion of the plug shown separately, FIG. 2 is a sectional view of the apparatus of FIG. 1 following insertion of the plug.

DESCRIPTION OF THE PREFERRED EMBODIMENT

Figure 3:
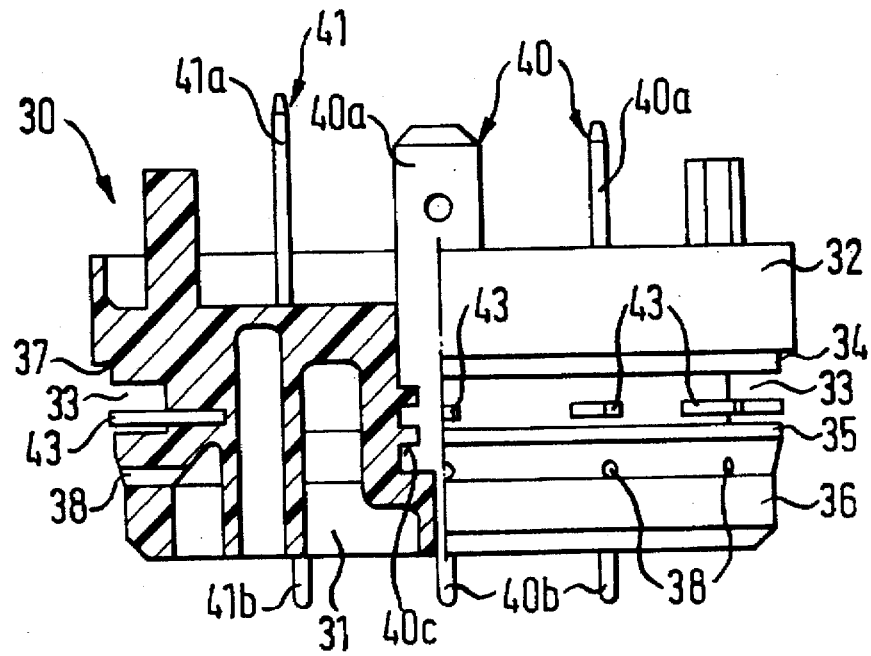
FIG. 3 is a partly sectioned view of the plug and FIG. 4 is a perspective view of the grounding contact member.

FIGS. 1 and 2 of the drawing show as an example for an electrotechnical apparatus in which the invention is applicable, an electromechanical level sensor 10 for monitoring a predetermined level in a container as it is known for instance from U.S. Pat. No. 4,594,584. The level sensor 10 has a screw-in part 11 having a threaded section 12 and a hexagon head 13. The inner space 14 of the screw-in part 11 is hollow and closed off at its bottom end by a diaphragm 15 to which the ends of two oscillating rods 16 and 17 are secured. By means of the screw-in part 11 the level sensor 10 is secured in a threaded opening of the container wall so that the oscillating rods 16, 17 protrude into the interior of the container and come into contact with the contents material when it has attained the level to be monitored.

In the hollow inner space 14 of the screw-in part 11 an electromechanical transducer arrangement 18 is disposed which is formed by a stack of piezoelectric elements. The transducer arrangement 18 contains excitation transducers and reception transducers. When an electrical AC voltage is applied to the excitation transducers they cause the diaphragm 15 to oscillate which is translated to the oscillating rods 16 and 17 so that they implement opposing oscillations transversely to their longitudinal direction. When mechanical oscillations act on the reception transducers they generate an electrical AC voltage having the frequency of the mechanical oscillations. A corresponding electronics assembly contains an amplifier which receives at its input the AC voltage generated by the reception transducers and at the output translates the amplified AC voltage to the excitation transducers. Thus, the mechanical oscillation system formed by the diaphragm 15 and the oscillating rods 16, 17 is located via the transducer arrangement 18 in the feedback circuit of the amplifier so that it is excited to oscillations at its natural resonant frequency.

The function of the level sensor 10 is based on the following phenomenon: when the oscillating rods 16, 17 are not in contact with the material in the container, the natural resonant frequency of the mechanical oscillation system is higher than when the oscillating rods 16, 17 dip into the material. The associated electronics assembly, therefore, contains in addition an evaluation circuit which detects whether the frequency of the AC voltage output by the amplifier, which is equal to the frequency of the mechanical oscillation, is above or below a given threshold value. When this frequency is above this threshold value, this means that the oscillating rods 16, 17 oscillate in air, i.e. the material has not attained the level to be monitored. When, on the other hand, the frequency is below the threshold value, this means that the material in the container has attained or exceeded the level to be monitored.

For accommodating the electronics assembly an electronics enclosure 20 is applied to the end face of the screw-in part 11 located outside of the container. The wall of the electronics enclosure 20 is formed by a metal tube 21 which is sealingly secured at one end to the screw-in part 11 and the other end of which is open. The electronics assembly is formed in the usual way by electronic components which are mounted on printed circuit boards 22; for simplification, only the printed circuit boards are illustrated in the drawing.

After the electronics assembly has been inserted in the electronics enclosure 20, the cavities in the electronics enclosure 20 and in the screw-in part 11 are filled with a potting compound 25 which is filled through the open end of the electronics enclosure 20 in the fluid condition and then hardened. The potting compound is, for example, a soft, gel-like two-component silicone rubber which after mixing of the two components is fluid and is then vulcanized by additive cross-linking. For filling the potting compound the apparatus must be brought into the vertical position shown in FIG. 1 in which the open end of the electronics enclosure 20 is located at the top. In operation, however, the apparatus can be fitted in any position; usually level sensors of the kind described are mounted horizontally on the side wall of the container at the height of the level to be monitored. It is to be noted that the terms "top" and "bottom" used in the following relate to the filling position as illustrated in the drawing.

So that in the electronics enclosure 20 irrespective of fluctuations in production and metering and independently of differing component sizes the desired filling height is maintained precisely, a spill tube 26 is disposed in the electronics enclosure 20 so that its top end is located at the desired filling height below the top edge of the electronics enclosure. At the bottom end the spill tube 26 communicates with an annular air chamber 28 formed in the transition region between the electronics enclosure 20 and the screw-in part 11, which is not in communication with the volume that receives the potting compound 25. Excess potting compound which would exceed the desired filling height flows off through the spill tube 26 into the air chamber 28 and collects as the spill quantity 27 at the bottom of the air chamber. Accordingly, the filling height of the potting compound 25 in the electronics enclosure 20 is always precisely maintained level with the top edge of the spill tube 26. Since the spill quantity in any case is small with respect to the volume of the air chamber 28, the air chamber remains to a major extent filled with air on completion of the filling procedure. The air volume trapped in the air chamber 44 acts in operation of the apparatus as a temperature barrier between the screw-in part 11 connected to the container and the electronics enclosure 20, as a result of which the heat transport from the level sensor to the electronics assembly is reduced. Moreover, the air volume present in the spill tube 26 takes up the overpressure generated in the electronics enclosure 20 when the potting compound expands on being heated.

Immediately after filling the potting compound 25, whilst it is still in the fluid condition, the open end of the electronics enclosure 20 is closed off by a plug 30 which is illustrated in FIG. 1 above the electronics enclosure 20 in the still open condition and which will now be explained in more detail with reference to FIGS. 3 and 4.

The plug 30 is a plastics molding produced, for example, by injection molding. Formed in the underside of the plug 30 is a recess 31. An upper section 32 of the plug has a diameter which is larger than the inner diameter of the metal tube 21. In the section adjoining downwards, a peripheral groove 33 running around the plug 30 is formed, and the rim portions 34 and 35 defining the peripheral groove 33 on both sides have a diameter which is slightly smaller than the inner diameter of the metal tube 21. The rim portion 35 located below the peripheral groove 33 translates into a peripheral rim 36 which surrounds the recess 31 and has an even smaller outer diameter than the rim portions 34 and 35. Thus, between the section 32 and the rim portion 34 a shoulder 37 exists which limits penetration of the plug 30 into the electronics enclosure 20, and the entirety of the part of the plug 30 located below the shoulder 37 fits with a light clearance in the electronics enclosure 20. Through the peripheral rim 36 vent holes 28 pass from the recess 31 to the outer periphery.

The plug 30 serves, in addition to closing off the electronics enclosure 20, also to connect the electronics assembly accommodated in the electronics enclosure 20 to external leads. For this purpose several metallic contact members 40 and a metallic grounding contact member 41 are incorporated in the plug 30, they being embedded in the plastics material on production of the plug. The contact members 40, of which two are evident in FIG. 3, arranged at right angles to each other, are all the same; each contact member 40 is a flat sheet-metal part having a flat terminal 40a protruding upwards from the plug 30 and a contact tip 40b protruding downwards from the plug 30. In the middle part embedded in the plug 30 notches 40c are provided which result in a better anchoring of the contact member in the plastics material.

Figure 4:
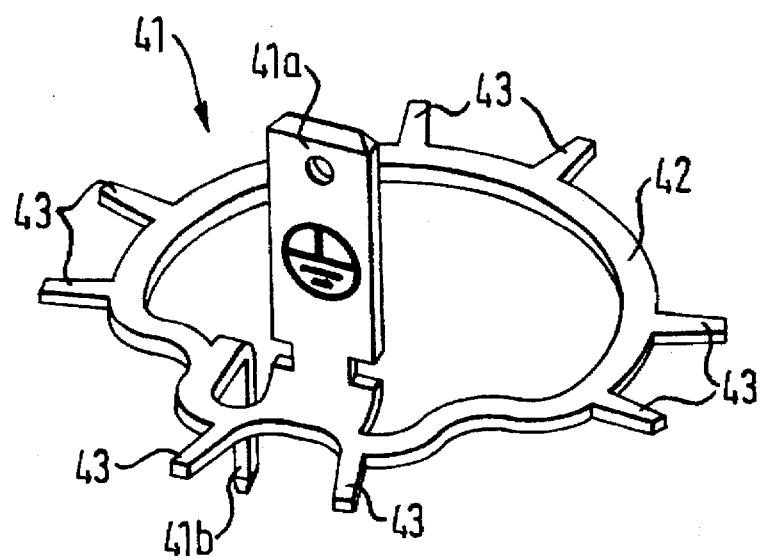

The grounding contact member 41 is shown in FIG. 4. It also has a flat terminal 41a protruding upwards from the plug and a contact tip 41b protruding downwards from the plug 30; these parts are, however, applied to a ring 42 such that they stand off perpendicular to the plane of the ring 42 to the one or the other side. In addition, several radially outward protruding elastic spring claws 43 in the form of flat fingers are applied to the outer periphery of the ring 42. To produce the grounding contact member 41 preferably all components are punched in one piece from an elastic sheet-metal plate, and subsequently the terminal 41a is bent out at a right angle to the one side and the contact tips 41b are bent out at right angles to the other side from the plane of the punching. The material used for the grounding contact member 41 may be spring steel, stainless steel or some other highly resilient metal.

Level with the peripheral groove 33 the ring 42 is embedded in the plastics material of the plug 30 such that the spring claws 43 protrude outwardly into the peripheral groove 33 and lie nearer to the lower rim portion 35 than to the upper rim portion 34. The ring 42 is formed such that it is completely insulated from the contact members 40. The radial length of the spring claws 43 is dimensioned such that the ends of the spring claws 43 lie on a circle, the diameter of which is somewhat larger than the inner diameter of the metal tube 21; thus, the spring claws 43 protrude around the plug 30 slightly past the periphery of the rim portions 34 and 35 when the plug is not yet inserted in the open end of the electronics enclosure 20.

On insertion of the plug 30 into the open end of the electronics enclosure 20 the ends of the spring claws 43 abut against the top edge of the metal tube 21, after the rim portion 35 has been inserted in the metal tube 21. On further insertion of the plug 30 the elastic spring claws 43 are flexed upwardly until their ends finally are able to slide downwardly along the inside surface of the metal tube 21. This flexing is made possible by the peripheral groove 33 which provides sufficient room for the change in shape upwardly. For this purpose it is also favorable when the spring claws 43 lie in the vicinity of the bottom rim portion 35. Although the flexed spring claws 43 permit easy insertion of the plug 30 into the metal tube 21, they exert a high resistance to the plug 30 being pulled out of the metal tube 21 since the ends of the spring claws 43 then dig into the metal tube 21. Accordingly, the plug 30 is reliably secured in the electronics enclosure 20 by the spring claws. In addition, due to the elastic flexing the ends of the spring claws 43 come into contact with the inside surface of the metal tube with considerable pressure force, resulting in a good electrical contact between the grounding contact member 41 and the metal tube 21. Both the holding effect and the contact making are all the better, the greater the number of spring claws 43.

So that the spring claws 43 can be correctly flexed to exercise these effects they need to be exposed over a sufficient length in the peripheral groove 33, and the amount by which they protrude past the inner diameter of the metal tube 21 must be neither too small nor too large. For a diameter of the plug 30 of approximately 40 mm the radial length of the spring claws 43 may amount to approximately 5 mm, and the spring claws should protrude by approximately 0.5 mm to 1 mm past the inner diameter of the metal tube 21.

On insertion of the plug 30 into the electronics enclosure 20, air present above the potting compound 25 is first displaced. This air is able to escape outwards with no problem through the narrow gap existing due to the clearance between the rim portions 34, 35 and the inner surface of the metal tube 21. This clearance is possible because the plug 30 is held by the spring claws 43 and thus the edge portions 34 and 35 need not exert any holding effect. When on further insertion of the plug 30 the peripheral edge 36 penetrates the fluid potting compound 25, some potting compound is displaced which flows off into the spill tube 26 so that the filling height in the electronics enclosure 20 remains unchanged. At the same time, air is trapped in the recess 31, however, this air being able to escape outwardly through the vent holes 38 so that no overpressure materializes in the recess 31.

When in conclusion the shoulder 37 rests on the top edge of the metal tube 21, the plug 30 is fully inserted (FIG. 2). Since in this position the spill tube 26 protrudes into the recess 31 of the plug 30, the filling height of the potting compound 25 lies in the recess 31, and thus also the lower part of the recess 31 and the annular space between the peripheral edge 36 and the metal tube 21 are filled with potting compound. Due to the gap existing between the rim portion 35 and the metal tube 21, potting compound is drawn upwards into the peripheral groove 33 due to the capillary effect. This potting compound collects in the peripheral groove 33, as a result of which it produces two effects: on the one hand, the ascending potting compound is prevented from emerging outwardly, and on the other, the potting compound having accumulated in the peripheral groove 33 produces a good additional seal between the plug 30 and the metal tube 21 when it as hardened.

When the plug 30 is inserted completely in the electronics enclosure in the way as shown in FIG. 2, the contact tips 40b, 41b of the contact members 40, 41 extending downwards from the underside of the plug 30 engage mating contact members of the electronics assembly. Mounted on the flat terminals 40a, 41a extending upwards is a connecting member 45 joined to a cable, as a result of which the connection between the cable and the electronics assembly in the electronics enclosure 20 is made.

It has been assumed in the above description that the open end of the electronics enclosure 20 and thus also the plug are round. However, the grounding contact member 41 having elastic spring claws 43 protruding from a ring 42 may also be applied in some other cross-sectional shape of the openings and plug to achieve the same advantageous effects, for instance in an elliptical, square or polygonal cross-section, it merely being necessary in any case that the ends of the elastic spring claws 43 in their relaxed condition protrude past a cross-section, corresponding to the cross-section of the opening, sufficiently so that the spring claws are flexed on insertion of the plug in the opening and come into resilient contact with the inner wall of the opening.

It is also not necessary that the electronics enclosure has a constant cross-section over its fully length as is the case of the metal tube described heretofor, it being sufficient that the region of the open end in which the plug is inserted is surrounded by a metal shroud into which the plug is fitted. The remaining part of the electronics enclosure may be of any shape.

We claim:

1. An electronics enclosure comprising: a metal shroud, an open end closed off by a plug of insulating material fitted in said metal shroud, in which contact members having connecting parts extending from said plug outwardly are provided for connecting an electronics assembly accommodated in said electronics enclosure to outer connecting leads, one of said contact members being a grounding contact member, wherein said plug includes a peripheral groove and said grounding contact member includes a ring connected to some of said connecting parts on which radially protruding spring claws of elastic material are provided, said ring being located level with said peripheral groove in said plug such that said spring claws protrude into said peripheral groove, and the length of said spring claws being dimensioned so that their ends protrude past a cross-section, corresponding to the cross-section of the opening of said metal shroud, to such an extent that said spring claws on insertion of said plug are flexed in said metal shroud and come into spring contact with the inside surface of said metal shroud.

2. The electronics enclosure as set forth in claim 1, wherein said connecting parts of said rings and said spring claws are punched in one piece from an elastic sheet-metal plate, and said connecting parts are bent out at right angles to the plane of said ring on opposite sides thereof.

3. The electronics enclosure as set forth in claim 1, wherein said plug is molded of plastic material in which said contact members are embedded.

4. The electronics enclosure as set forth in claim 3, wherein said plug has a portion having a cross-section which is greater than said opening cross-section of said metal shroud so that it limits penetration of said plug into said metal shroud.

5. The electronics enclosure as set forth in claim 1, wherein the edge portions of said plug located on both sides of said peripheral groove, which are located within said metal shroud when said plug is fully inserted, have a cross-section which is slightly smaller than said opening cross-section of said metal shroud, so that a narrow gap exists between these rim portions and said metal shroud.

6. The electronics enclosure as set forth in claim 5 which is filled directly prior to insertion of said plug with a fluid potting compound which hardens following insertion of said plug, wherein the gap between said edge portions of said plug and said metal shroud is dimensioned so that potting compound is drawn into said peripheral groove by capillary effect.

7. The electronics enclosure as set forth in claim 6, wherein a recess is formed in the end face of said plug located in the interior of said electronics enclosure and said plug dips into said potting compound so far that said recess is filled with potting compound at least partly.

8. The electronics enclosure as set forth in claim 7, wherein vent holes extend from said recess to the outer periphery of said plug.

\* \* \* \* \*